Patented May 15, 1951

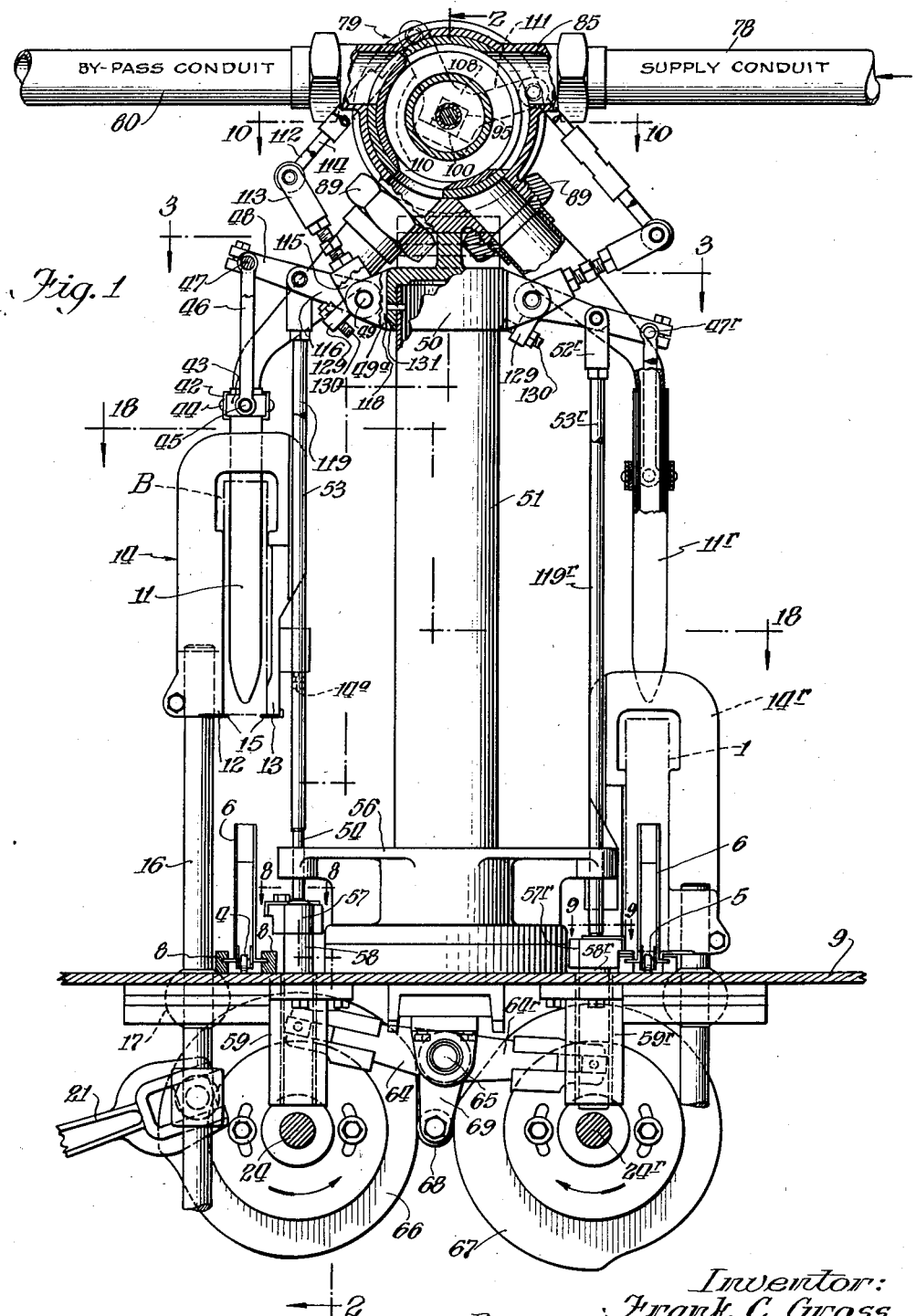

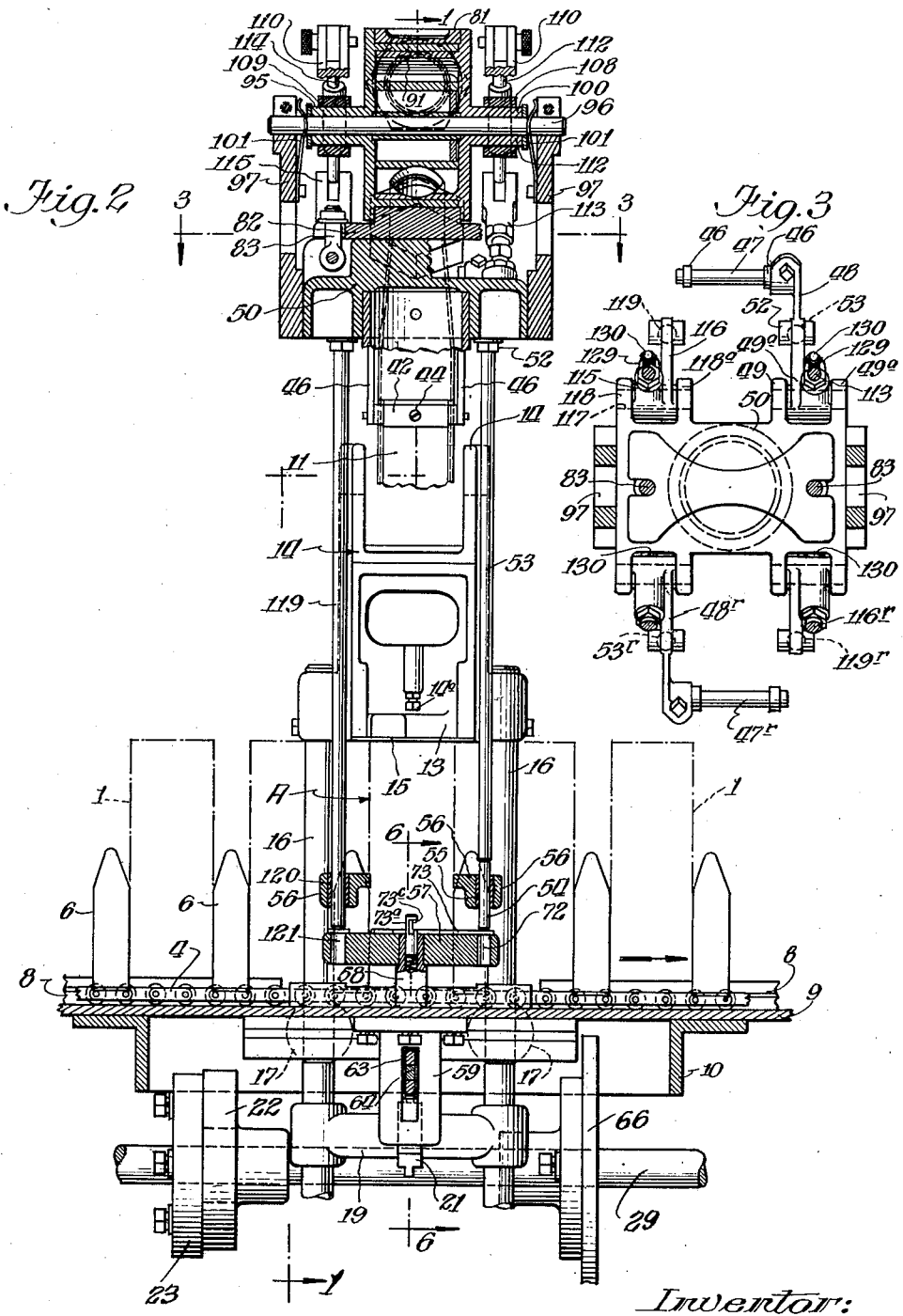

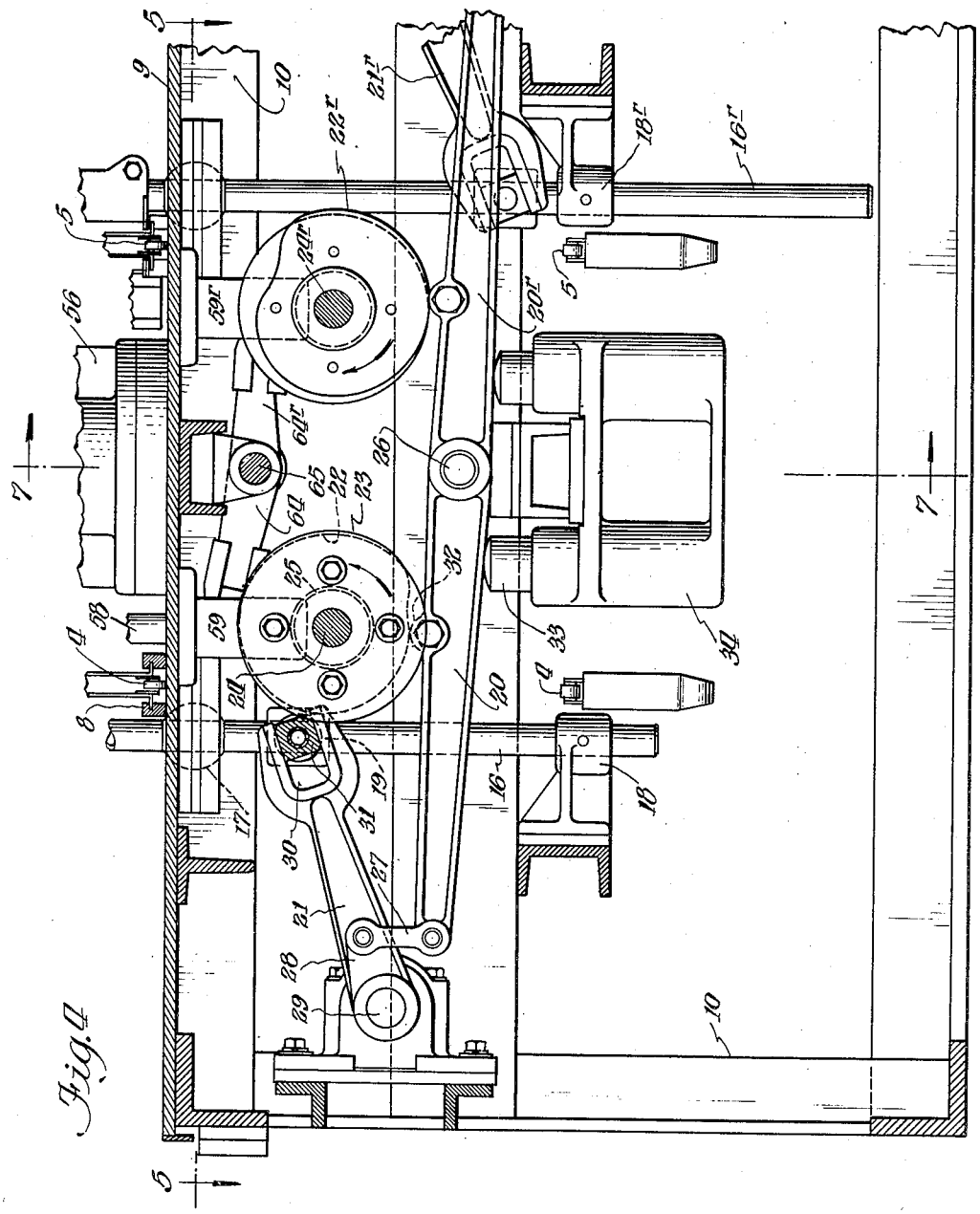

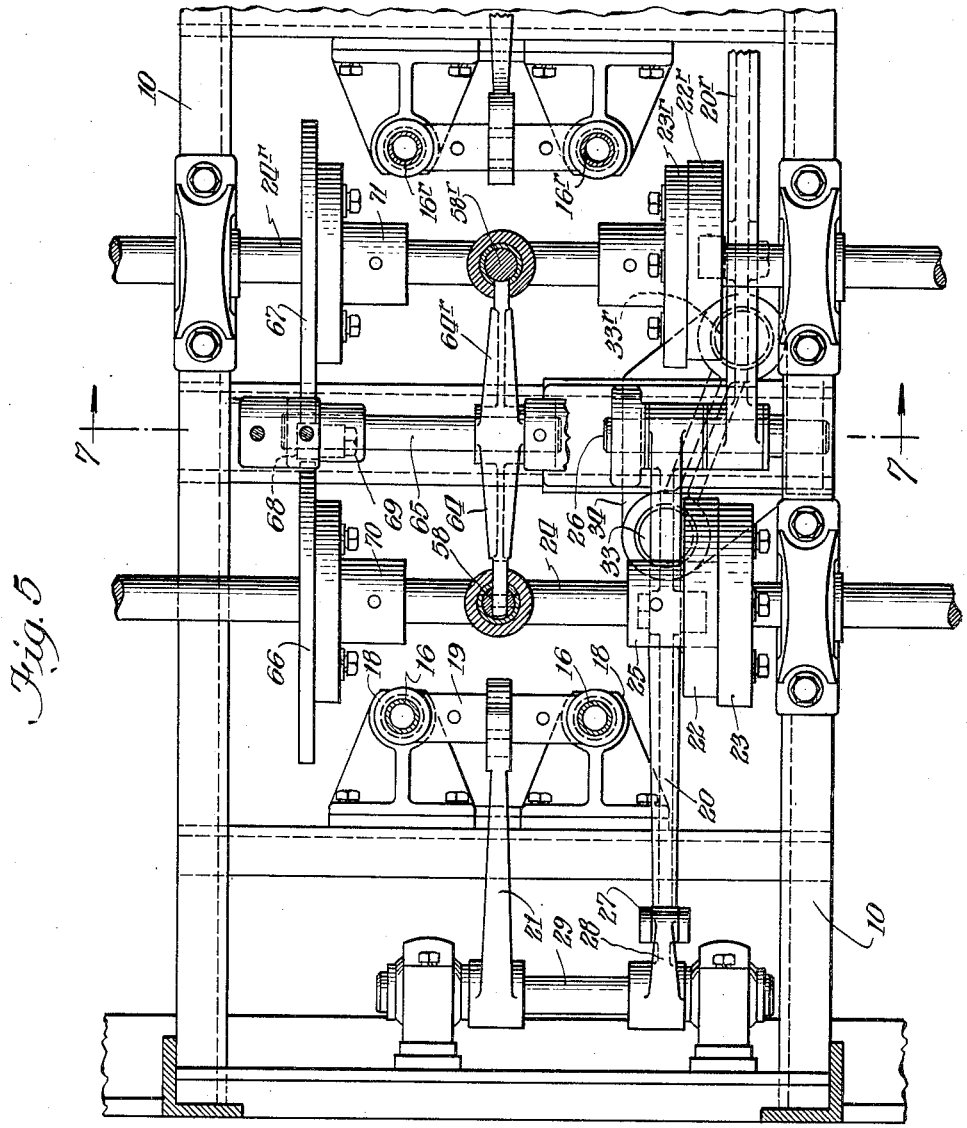

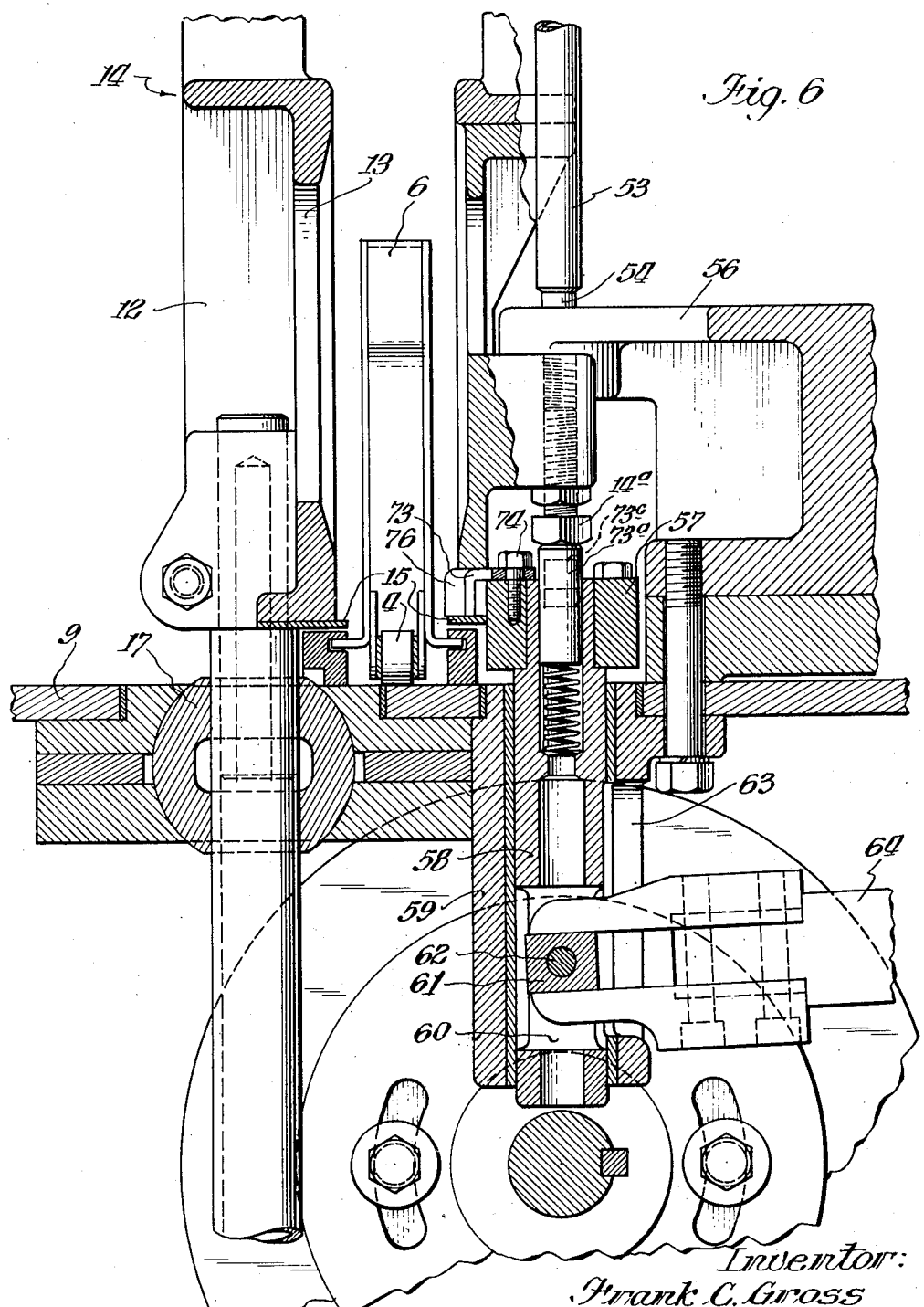

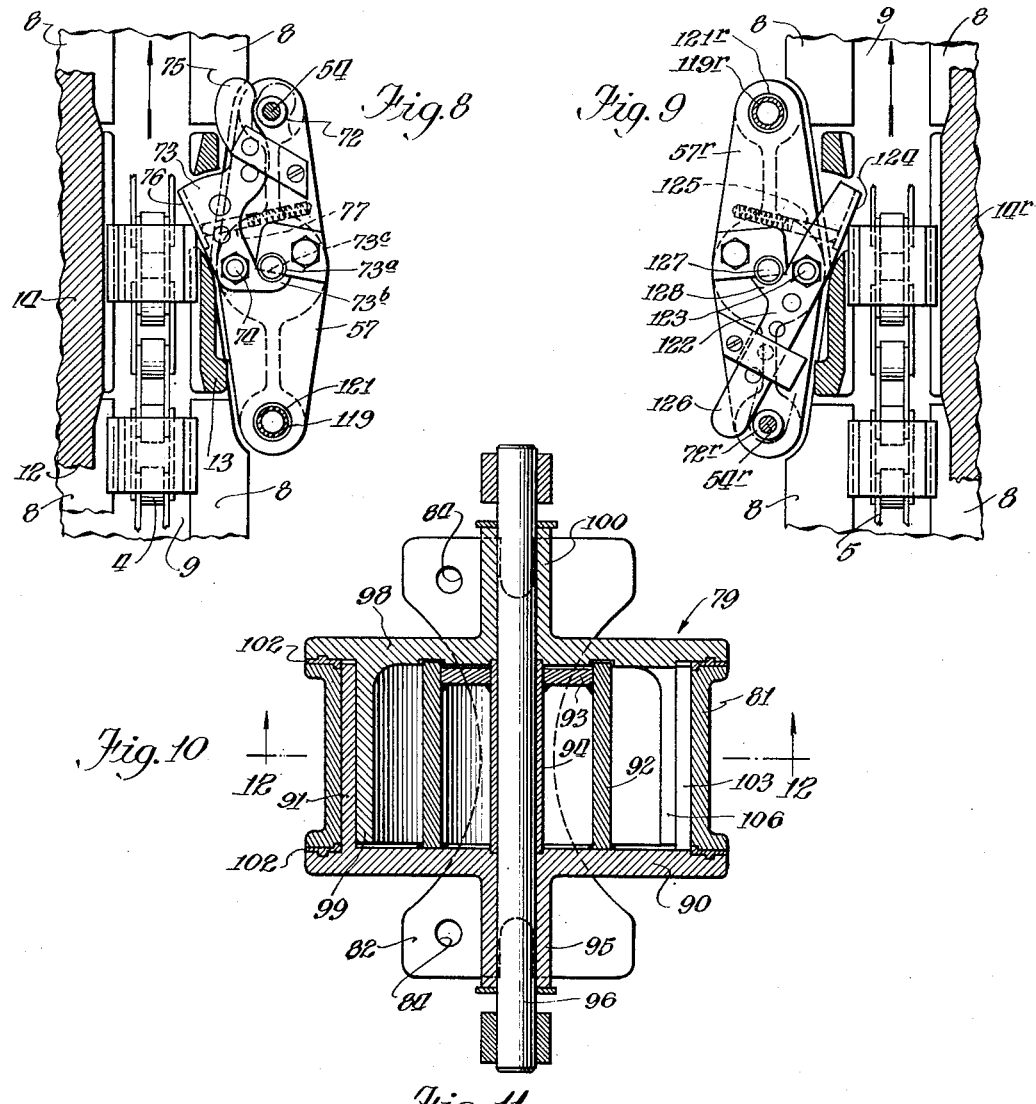

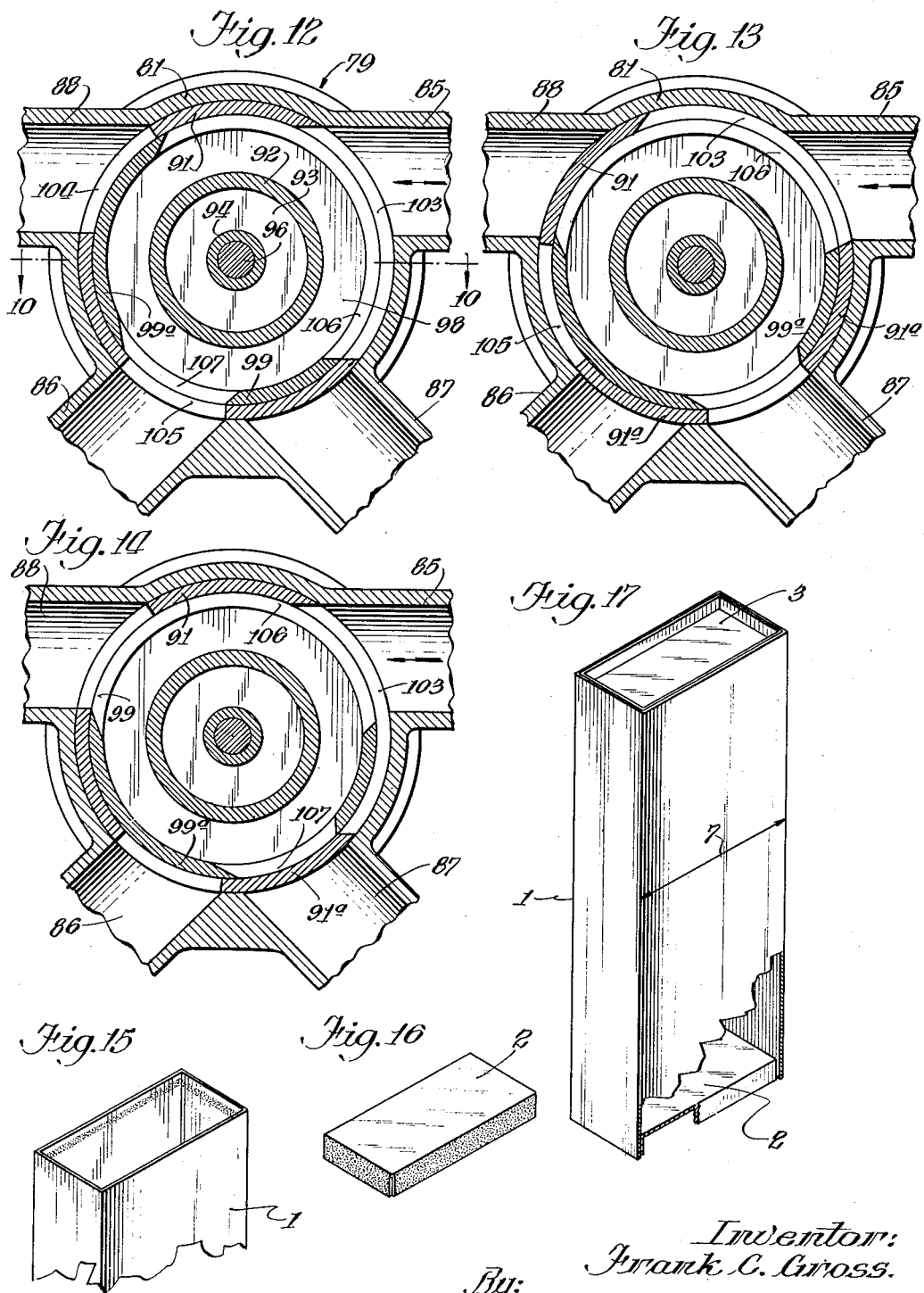

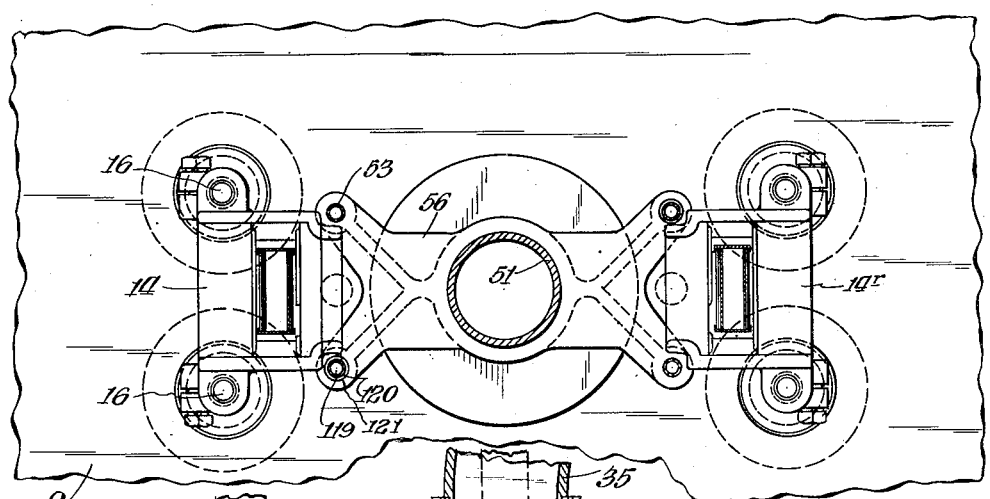
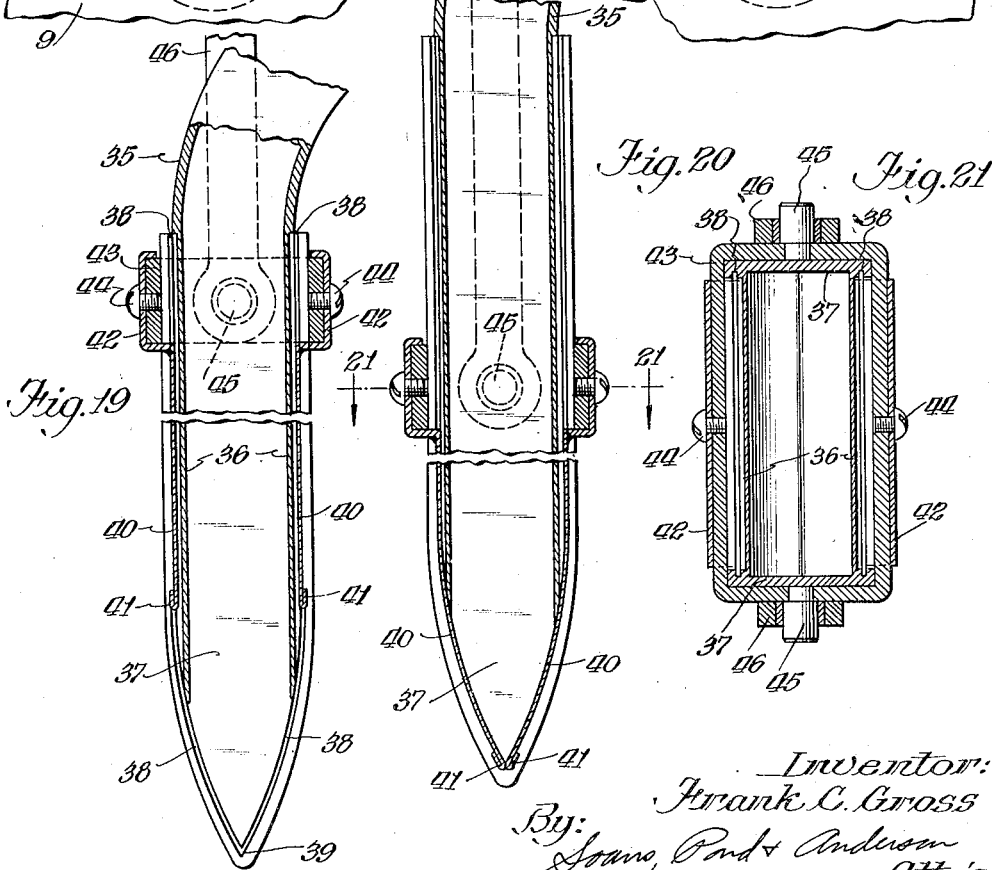

2,553,250

UNITED STATES PATENT OFFICE 2,553,250

APPARATUS FOR FILLING CONTAINERS WITH ICE CREAM OR THE LIKE

Frank C. Gross, Chicago, Ill., assignor, by mesne assignments, to Package Machinery Company, East Longmeadow, Mass., a corporation of Massachusetts Application September 3, 1948, Serial No. 47,722

15 Claims. (Cl. 226—99)

This invention relates to an improved container filling method and apparatus and it has been made especially in connection with the filling of containers with ice cream and will hereinafter be described in that connection.

Ice cream is normally packaged while in a viscous fluid condition and then hardened usually by being subjected to a low freezing temperature in a so-called hardening room. The ice cream contains a substantial volume of air dispersed throughout its body and it is important to avoid displacement from the ice cream, of this normal air content. The fluid material is, of course, partially frozen and has a tendency to harden if permitted to rest at any point, for example, at the delivery nozzle or in the control valve of a filling machine.

The main objects of this invention are to provide a method and apparatus whereby ice cream being delivered into containers may be maintained under a substantially constant pressure and in a state of substantially constant flow from the ice cream freezer to the outlet or nozzle from which the material is discharged into containers, thereby to avoid displacement of the normal air content from the material, and also to avoid congealing or hardening and fixation of the material in the course of its travel from the freezer to the container.

By providing a filling arrangement in which a substantially constant pressure is maintained in the stream of ice cream, the preparation of ice cream packages of substantially uniform bulk and weight is facilitated, as is also the employment of continuous freezing equipment for producing the ice cream. Hence, another object of the invention is to provide a method and apparatus whereby ice cream or similar fluid material may be automatically put up in packages of substantially uniform bulk and weight.

A further object is to provide a packaging of the character indicated, which will be rapid in operation so as to be capable of effectively packaging the output of continuous ice cream freezers (or similar continuous producers of other materials having packaging characteristics similar to fluid ice cream); and, in general, it is the object of the invention to provide an improved packaging method and apparatus of the character indicated.

Other objects and advantages of the invention will be understood by reference to the following specification and accompanying drawings (9 sheets) in which there is illustrated a selected form of apparatus for packaging ice cream according to the improved method.

In the drawings:

Fig. 1 is a view mainly in side elevation, but partially in section showing the principal elements of the improved mechanism, the plane of Fig. 1 being indicated by the line 1—1 on Fig. 2;

Fig. 2 is a vertical section on the plane represented by the line 2—2 of Fig. 1;

Fig. 3 is horizontal section on the plane represented by the line 3—3 of Figs. 1 and 2;

Fig. 4 is a section through the lower portion of the mechanism, and is, in effect, a downward continuation of Fig. 2;

Fig. 5 is a plan section on the plane represented by the line 5—5 of Fig. 4;

Fig. 6 is a section on the plane represented by the line 6—6 of Fig. 2, certain parts being shown in Fig. 6 in a different position than in Fig. 2;

Figure 7:
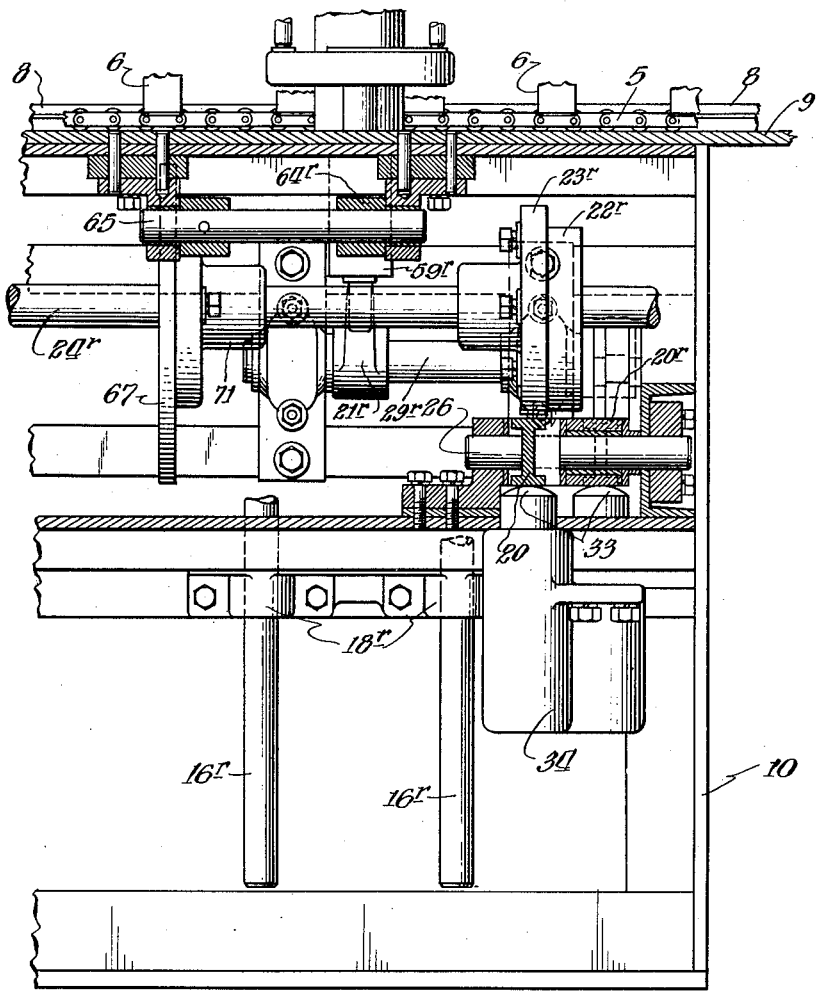
Fig. 7 is a vertical section on the plane represented by the line 7—7 of Figs. 4 and 5.

Figs. 8 and 9 are plan sections, respectively, on the planes indicated by the lines 8—8 and 9—9 of Fig. 1;

Fig. 10 is a plan section on a plane represented by the lines 10—10 of Figs. 1 and 12;

Fig. 11 is a timing diagram;

Fig. 12 is a cross-section on a plane represented by the line 12—12 of Fig. 10, and it is also an enlargement of a portion of the structure shown in Fig. 1;

Figs. 13 and 14 correspond to Fig. 12, but show changed positions of the parts;

Figs. 15, 16, and 17, are perspectives illustrating the construction of a type of container which is adapted to be filled by the improved method and apparatus;

Fig. 18 is a plan section on the plane represented by the line 18—18 of Fig. 1;

Fig. 19 is a section illustrating certain details of the filling spout or nozzle;

Fig. 20 is a view similar to Fig. 19, but showing a changed position of certain parts of the nozzle;

Fig. 21 is a plan section on the plane represented by the line 21—21 of Fig. 20.

The illustrated apparatus is designed for filling generally rectangular paperboard cartons which may embody the constructions shown in Figs. 15, 16, and 17. As there shown, the cartons comprise a rectangular tubular paperboard body 1 which initially has one end closed by an end closure 2. The opposite end is, of course, left open until the container is filled, after which another end closure 3 is applied to close the said opposite or upper end of the tubular body. The closures 2 and 3 may be of the inserted type shown, the said closures having side flanges which are adhesively united to the inside faces of the marginal end portions of the body walls by adhesive initially applied to either the flanges of the end closures or to the inside faces of said marginal end portions to the walls, or both. It is preferable that the adhesive be of a thermoplastic character not effected by moisture, and also that the container body and the inside faces of the end closures be coated with a suitable moisture-proofing material such as paraffin or other material. It is not essential that the container be of the inserted end closure type described since the apparatus (perhaps with minor changes) is capable of handling any style of container having an open end to permit filling of the character described.

In the apparatus shown, containers of the character described are intermittently fed, i. e., step by step, along two filling lines respectively embodying conveyor chains 4 and 5, (Fig. 1). These conveyors operate in relatively spaced, substantially parallel paths, and they are alternately actuated by any suitable mechanism which is well known in the art, and is not herein illustrated.

The conveyors are each provided with upstanding pushers 6 (Figs. 1 and 2) spaced uniformly along the lengths of the conveyors so as to provide spaces between adjacent pushers of each conveyor. The spaces between the pushers are of a dimension which substantially corresponds to one of the transverse dimensions of the containers to be filled, in this case to the edge-to-edge dimension 7 (Fig. 17). The conveying chains 4 and 5 travel between guide strips such as represented at 8 on which the lower ends of the containers rest and slide as they are propelled by the respective conveyors and pushers. These guides 8 and the conveyors are supported on a table plate or top 9 which is carried by a suitable base frame 10 (Figs. 1 and 4).

The conveyor chain 4 advances cartons successively to a position represented at A (Fig. 2) which is vertically below a filling spout or nozzle 11 (Figs. 1 and 2). When the carton is delivered into said position A, it is positioned between the outer and inner legs 12 and 13 respectively of an inverted U-shaped carton elevator 14. This elevator 14 is shown in an elevated position in Fig. 1, and in its lowered position in Fig. 6. The innermost face portions of said elevator legs 12 and 13 are spaced apart a distance corresponding to the width of the narrow edge walls of the container so as to freely receive but adequately support and properly position the container. The lower ends of said legs are provided with inwardly projecting ledge plates 15, the upper surfaces of which are initially coplaner with the top surfaces of the guide strips 8 so that the lower ends of the containers come to rest on said ledge plates 15—15.

The elevator 14 is supported for vertical movement by a pair of vertically reciprocable tubular posts 16—16 (Figs. 2 and 5), the upper ends of which are clamped in sockets formed in the opposite sides of the outer leg 12 of the elevator or carrier 14. Said posts 16 are slidable through self-aligning bearing bushings 17 mounted on the table top 9, and in frame-carried bearings 18—18 as shown in Figs. 4 and 5.

Intermediate the upper and lower bearings 17 and 18, the posts 16 are rigidly interconnected by a cross arm 19.

Vertical reciprocation is imparted to the rods 16—16 and the elevator 14 by cam mechanism operating through pivoted arms 20 and 21, as best shown in Figs. 4 and 5. As there shown, a cam 22 is rotatably adjustably secured to a shaft 24 through the agency of a suitable hub 25. The shaft 24 is continuously driven by any suitable means (not shown) at a speed of rotation which will cause the cam 22 to operate the parts according to a predetermined timing. The arm 20 is pivoted at one end on a shaft 26 which is suitably supported from the framework of the apparatus. The free end of said arm 20 is connected by means of a link 27 to a short arm 28 which projects from a rock shaft 29 suitably journalled in bearings carried by the frame structure. The rock arm 21, previously mentioned, is also carried by said shaft 29 so as to rock in unison therewith, and the free end of said arm 21 is forked as shown at 30 to slidingly embrace a block 31 which is rotatably supported by an intermediate portion of the cross arm 19.

In the arrangement shown, the cam 22 acts against a roller 32 carried by the lever arm 20 to rock the arm downwardly about the axis of its pivot shaft 26. To maintain the cam-following roller 32 in operative engagement with the periphery of the cam, a spring-biased pin or plunger 33 is supported under the arm and in engagement therewith by means of a suitable bracket structure 34 which is in turn rigidly mounted on the frame structure. If preferred, the cam 22 may be in the form of a box cam which will positively control the rocking of the frame 20 in both directions without the aid of the aforesaid spring pressed pin arrangement.

It will be seen that the cam 22 is operative to reciprocate the rod pair 16, once for each rotation of the cam.

As shown in Fig. 1, the elevator member 14 is in its uppermost position. When in that position, a container is disposed in initial filling position represented at B (Fig. 1). The container then surrounds or encloses the filling spout 11. As the elevator 14 begins its downward movement, the spout 11 is opened to permit the flow of material from the spout into the container as the latter descends and the spout is again closed at a predetermined interval before the container is delivered to its lowermost position preparatory to advancement from the filling apparatus to closing apparatus.

The construction of the spout is best shown in Figs. 19, 20, and 21, to which reference is now directed.

The spout consists of a tube 35 of rectangular cross-section of a size which will fit freely within the containers to be filled. The lower end portion of said tube 35 has lower opposed side wall portions 36 of reduced thickness and opposed edge wall portions 37 of somewhat increased thickness, and provided with marginal portions extending outwardly beyond the outside faces of the other wall portions 36. The wall portions 37 extend downwardly below the lower ends of the wall portions 36 as shown in Figs. 19 and 20, and they are gradually tapered in width to a rounded point as shown.

The marginal portions of the walls 37 are slotted as indicated at 38 outwardly of the wall portions 36 and said slots 38 have lower portions of curved form substantially paralleling the side edges of the tapered lower end portions of the walls 37 so that said slots come together as indicated at 39. In the slots 38 there are slidably mounted flexible sheet metal nozzle plates 40—40 which have their lower ends outwardly rebent as indicated at 41 to provide stiffness against transverse buckling. These rebent end portions 41 do not, however, interfere with flexing members 40 lengthwise to conform with the curvature of the lower portions of the slots 38 when said plates 40 are moved up and down in said slots. As shown in Fig. 19 the nozzle plates 40 are in their up or open position, the lower ends of the plates being then somewhat above the lower ends of the side walls 36. As shown in Fig. 18, said plates 40 are in their down or closed positions in which the lower ends of the plates abut so as to cooperate with the opposite walls 37 to close the outlet end of the nozzle or discharge tube.

The upper ends of the nozzle plates 40 are suitably secured to or formed with outwardly offset but inwardly facing U-shaped portions 42, and these U-shaped portions embrace opposite side walls of a rectangular band or annulus 43 which extends around the nozzle structure and is slidable up and down thereon, being guided mainly by the opposite side wall portions 37 of the nozzle.

Screws such as indicated at 44 are provided for detachably securing the nozzle plates to said band 43. The other pair of opposed legs of the band 43 are equipped with outwardly extending pins 45 through which the band 43 and its nozzle plates 40 are moved up and down. A pair of links 46 extend upwardly from said pins 45 on which the links are pivoted, and have their upper ends pivotally connected to a rod 47 carried by a rock arm 48 (Figs. 1 and 3) which is rockable on a pivot pin 49. The pivot pin 49 is seated in a pair of ears 49a which are formed integrally with a cap 50 which is supported by a post 51 extending upwardly from the supporting frame table 9.

For actuating the nozzle plates 40, the clevis 52 on the upper end of a push rod 53 is pivoted to the rock arm 48 intermediate the ends of the arm (Fig. 3). At its lower end, said push rod 53 has a reduced diameter portion 54 (Fig. 2) which is guided for vertical movement in a suitably bushed guide hole 55 in a bracket structure 56 (see also Figs. 1 and 6). The bracket structure 56 is in the form of a base member for the vertical column 51, and it is a stationary member supported by the table plate 9 and the underlying frame structure 10. The bushing in the opening 55 may be in the form of a self-aligning bearing member to permit the rod 53 to rock slightly as required by the arcuate movement of its upper end about the axis of the rock shaft 48, or it may receive said rod portion 54 with sufficient looseness to permit the required rocking movement of the rod.

The rod is adapted to be moved upwardly by a cross-head 57 carried by the upper end of a vertically movable slide 58. Said slide 58 is slidable vertically in a suitably bushed bearing member 59 which is secured to and depends from the table plate 9 as best shown in Fig. 6. Said slide 58 is longitudinally slotted intermediate its ends as indicated at 60, and it is provided within the slot with a block 61 which is journalled on a pin 62 carried by the slide. The bearing member 59 is also slotted as indicated at 63 in alignment with the slot 60 in the slide.

A rock arm 64 is secured intermediate its ends to a rock shaft 65 (Figs. 1 and 5) which is journalled in suitable bearings carried by the frame structure, and one end of said arm 64 is provided with a suitable fork arrangement which slidably embraces the block 61 in the slot 60. It will be seen that rocking of said arm 64 will impart vertical sliding movement to said slide 58.

Rocking movement is imparted to the arm 64 and the shaft 65 on which it is mounted by means of a pair of co-acting cams 66 and 67, the cam 66 being secured to the continuously driven shaft 24, and the cam 67 to a similar continuously driven shaft 24r. Said cams 66 and 67 act against a roller 68 (see also Fig. 1) carried by a free end of an arm 69 which depends from and is secured to said shaft 65. The cams 66 and 67 have their peripheries so formed that together they will positively rock the arm 69 and shaft 65 and parts carried thereby. Said cams 66 and 67 are rotatably adjustably secured to suitable flanged mounting hubs 70 and 71, respectively, which are in turn secured directly to the shafts 24 and 24r by pins, keys, or otherwise, so as to rotate in unison with the shafts.

The crosshead 57 is fixedly mounted on the upper end of said vertically movable slide 58 so as to move in unison therewith. Upward movement of the crosshead 57 is transmitted to the rod 53 and thereby to said rock arm 48 to actuate the nozzle closure plates. Provision is made in connection with the transfer of upward movement from the member 57 to the rod 53 to prevent actuation of the rod 53 in the event that there is no container in place to receive a discharge of ice cream or other material from the spout. This means consists of the mechanism best shown in Fig. 8.

As shown in Fig. 8, the vertically movable crosshead 57 is provided with a vertically extending hole 72 of a diameter which is adapted to freely slidably receive the reduced diameter end portion 54 of the rod 53 (see also Fig. 2). On the top of the crosshead 57, a latch arm 73 is pivotally mounted as indicated at 74 and said arm has an end portion 75 which is adapted to be rocked laterally from the offset, inoperative position shown in Fig. 8 to a position overlying the hole 72. When the latch arm 73 is in its offset position as shown in Fig. 8, vertical movement of the crosshead 57 will not be imparted to the rod 53 since the rod portion 54 will be received in the hole 72 without transmitting any motion to the rod. However, when the latch arm 73 is rocked inwardly, the end portion 75 thereof will overlie said hole so that the latch portion 75 will engage the lower end of the rod portion 54 when the crosshead 57 is moved upwardly, thereby to impart the desired upward movement to the rod 53.

The latch arm 73 is actuated by successive cartons for which purpose it has an intermediate portion 76 projecting angularly into the path of carton. As the carton is brought into the aforesaid position A, it will engage said angular latch portion 76 and force the same to move laterally as required to locate the end portion 75 over the hole 72. A suitably arranged spring pressed pin 77 normally urges the latch arm 73 to move to its position for actuation by the cartons. When the carton is moved upwardly above the plane of the latch arm 73 a spring pressed latch pin 73a is moved upwardly in front of an edge of the rear end portion 73b of the arm so as to lock the arm in operative position against the pressure of the pin 77. The latch pin 73a has a recess 73c in its side for receiving said latch arm end portion 73b when the pin 73a is depressed as hereinafter explained, in connection with the discharge of a filled carton.

As already explained, the present apparatus is a double-line machine. Cartons advanced by the conveyor lines 5 are filled by a nozzle or filling spout 11r which is of the same construction and operated in the same manner as the spout 11. Various parts associated with the filling spout 11r which correspond to parts associated with the spout 11 are designated in the drawings by the same numbers applied to the parts for the spout 11 with the addition of the exponent r. The filling operations are effected alternately on the conveyor lines 4 and 5 substantially as indicated by the timing diagram shown in Fig. 11.

The filling spouts 11 and 11r receive ice cream (or other material) from a pipe line 78, and through a valve 79 which normally effects distribution of the material alternately to the said spouts. A discharge or by-pass conduit 80 also extends from the valve 79 for carrying away ice cream or other material so as to maintain continuity of the flow thereof in the supply line 78 in the event that either spout 11 or 11r is kept closed for one cycle of operation because of the absence of a container to receive the ice cream.

The valve 79 comprises a substantially cylindrical shell or body 81 which has a foot 82 formed integrally therewith, and through which said body may be mounted on a seat provided on the cap 50. The valve body is preferably detachably mounted on said cap by suitable means such as eyebolts 83 pivoted to the cap 50, and provided with a washer and nut for clamping the foot 82 tightly to the said cap. Suitable dowel pins may project upwardly from the cap to enter openings 84 (Fig. 10) provided in the foot 82 for valve body positioning purposes. The valve body is provided with an inlet port 85 (see Figs. 1, and 12 to 14, inclusive), outlet ports 86 and 87, and a by-pass port 88 which is preferably coaxial with the inlet port 85. The nozzles 11 and 11r are detachably connected to the outlet ports 86 and 87, respectively, by suitably easily separable couplings indicated at 89 (Fig. 1) and the inlet and by-pass conduits 78 and 80 are similarly detachably coupled to the valve body. This facilitates removal of the valve structure from the machine for cleaning and other purposes when desired. One side of the valve body 81 is closed by an end plate 90 which carries an inwardly extending cylindrical wall 91 which rotatably fits in the cylindrical valve body 81. Said end wall 90 also is provided with an annular wall 92 which has the end remote from the wall 90 closed by a disc or washer 93 extending between said annular wall 92 and an axial bushing 94 which is also rigid with the end wall 90. The end wall 90 also has an outwardly projecting bearing hub 95 whereby said end wall 90 is rotatably mounted on a normally stationary shaft 96 which is fixedly supported in upstanding bracket arms 97—97 carried by the cap 50 as best shown in Fig. 2.

Again referring to Fig. 10 and Figs. 12 to 14, inclusive, the other end of the valve body 81 is closed by an end plate 98 which has an inwardly projecting cylindrical wall structure 99 rotatably fitting the inside of the cylindrical wall 91. Said end plate 98 also has an outwardly projecting bearing hub 100 whereby the end wall 98 is rotatably mounted on the said shaft 96.

As shown in Fig. 2, inwardly biased leaf springs 101 are carried by the bracket arms 97 and act against the ends of the hubs 95 and 100 through the agency of suitable bushings or washers. These springs 101 serve to urge the end plates 90 and 98 toward each other and into leakproof engagement with the respective ends of the valve body 81. Suitable antifriction washers 102 (Fig. 10) may be provided between the end members 90 and 98 and the respective ends of the valve body 81, these washers being also preferably formed with offset annular ribs as shown to provide a labyrinth seal between the parts.

The outer annular wall 91 of the valve structure is provided with an elongated circumferentially extending port 103 (see Figs. 12 to 14) and approximately circular ports 104 and 105. The inner annular wall 99 is provided with a circumferentially elongated port 106 and an approximately circular port 107. In the normal operation of the apparatus, i. e., wherein there is an unbroken succession of containers presented to the filling spouts, the valve walls 91 and 99 are rocked as a unit so that said walls maintain the relationship shown in Figs. 12 and 13. As shown in Fig. 12, the valve is set so that material delivered into the valve body through the inlet port 85 will flow through the annular space between the annular wall 92 and the inner cylindrical wall 99, through the outlet ports 107 and 105 into the outlet port 86, and thence to the filling spout 11. To divert the flow of material from the spout 11 to the spout 11r, the said outer and inner valve walls 91 and 99 are rotated in unison from the position shown in Fig. 12 to the position shown in Fig. 13 from which it will be seen that communication will thereby be established between the inlet port 85 and the outlet port 87 which communicates with the spout 11r while the outlet port 86 is closed from the interior of the valve structure. In the normal operation of the machine as aforesaid, the valve walls 91 and 99 oscillate between the positions shown in Figs. 12 and 13, and no material will be delivered to the by-pass port 88.

In the event that there is a failure of carton delivery to one of the spouts, only one of the annular valve walls will be actuated so as to close off the spout which has just completed the filling of a carton without opening the port to the cartonless spout. For example, Fig. 14 illustrates the condition which will occur in the event that there is a failure to deliver a carton to the spout 11r. In that event, upon completion of the filling of a carton by the spout 11, the inner annular wall 99 alone will be rotated in a counterclockwise direction from the position shown in Fig. 12 to the position shown in Fig. 14 whereby communication from the interior of the valve to the spout 86 will be closed without also opening communication to the outlet port 87 and spout 11r. When the inner annular wall 99 is so moved independently of the wall 91, the elongated port 106 will be caused to establish direct communication between the inlet port 85 and the by-pass outlet 88. Hence, even though carton filling is interrupted, there will be no significant interruption of the flow of ice cream in the pipe line leading into the valve structure.

Similarly, if there is a failure of carton delivery to the spout 11 to receive ice cream upon completion of the filling of a carton by the spout 11r, the outer annular wall 91 will alone be rotated in a clockwise direction from the position shown in Fig. 13 so as to cause its segment 91a to close the outlet port 87. When the segment 91a closes said port 86, the port 105 will be aligned with the bypass port 88 and a communication will be established from the inlet port 85 through the ports 103, 106 and 105 to the bypass outlet 88.

For actuating the inner and outer valve sleeves 91 and 99, the hubs 95 and 100, respectively, are of squared cross-section as indicated in Fig. 1.

On the hubs 95 and 100 there are secured double-armed members 108 and 109 (see also Fig. 2), each of which have arms 110 and 111 disposed in angular relation to each other. The arms 110 of each of the members 108 and 109 are in parallel relation as are also the arms 111 of the two members.

The arm 110 of the member 108 is connected by an adjustable link 112 to an adjustable length arm 113 which is rigidly secured to or formed integral with the rock arm 48 (Fig. 3) so as to be actuated thereby. The arm 48, and hence the arm 113, link 112, member 108 and inner valve sleeve 99, are actuated through the agency of the rod 53 as already explained.

The outer valve sleeve 91 is adapted to be actuated as a unit with the inner sleeve 99, through the member 109 on the hub 95 of said outer valve sleeve. The arm 110 of said other member 109 is connected by a link 114 to an arm 115 which is rigid with a rock arm 116. The rock arm 115—116 is mounted on a pivot shaft 117 which is supported by ears or lugs 118 and 118a (Fig. 3) of the cap 58. An actuating push rod 119 is pivoted at its upper end to the free or outer end of the rock arm 116. The lower end portion of said rod 114 is slidable through an eye 120 in the bracket 56 (Figs. 2 and 18) and the lower end of said push rod 119 is adapted to be engaged by the crosshead 57 when the latter is moved upwardly to also actuate the rod 53. The cross head may be provided with a hardened insert 121 (Fig. 2) for engaging the end of the rod 119 to thereby avoid wear of the crosshead 57.

The rods 53 and 119 are positively moved upwardly by the crosshead 57 in the normal operation of the machine, and such movement of the rods effects positive rotary movement of the valve sleeves 91 and 99 in one direction. Downward movement of the crosshead 57 does not correspondingly effect return movement of the rods 53 and 119 or of the valve sleeves, but merely permits them to be returned as an incident to reverse rotary movement of said valve sleeves 91 and 99 which is normally positively effected by upward movement of the rods 53r and 119r which are associated with the spout 11r. These rods are moved upwardly by means of a crosshead 57r (Fig. 1) which is in turn moved vertically by an extension 64r of the arm 64. The cams 66 and 67 are so formed that the arms 64 and 64r are rocked at uniformly spaced time periods so that for each cycle of operation the crosshead 57 will be held in its up position as shown in Fig. 1 during one-half of the cycle while the crosshead 57r will be held in up position through the other half of the cycle while the member 57 occupies its lower position.

The rod 53r is connected to the outer valve sleeve 91 to thereby act opposite to the rod 119, and the rod 119r is connected to the inner valve sleeves 99 to thereby act opposite the rod 53. The connections from the rod 53r and the outer valve sleeve 91 are counterparts of the connections between the rod 53 and the inner valve sleeve 99, and the connections from the rod 119r to the inner valve sleeve 99 are counterparts of the connections between the rod 119 and the outer valve sleeve 91. Hence the valve sleeves will normally be rocked alternately to the positions shown in Figs. 12 and 13.

In Fig. 12 the valve elements are shown in the position which they occupy when a carton filling operation is completed by the spout 11, the crosshead 57 will be lowered and the crosshead 57r will be elevated, thereby shifting the valve parts from the position shown in Fig. 12 to that shown in Fig. 13 which causes delivery of material to the spout 11r. Similarly, when a filling operation is completed by the spout 11r, the crosshead 57 moves upwardly and the crosshead 57r moves downwardly to restore the valve parts to the condition shown in Fig. 12.

In the event that there is a failure of carton delivery by the carrier 14r to the spout 11r, a latch and hole arrangement shown in Fig. 9 (which is similar to the latch and hole arrangement shown in Fig. 8 and previously explained), will prevent the rod 53r from being moved upwardly when the crosshead 57r is moved upwardly. The rod 119r will, however, be actuated and this rod, acting through the described connections, will shift the inner sleeve member 99 from the position shown in Fig. 12 to the position shown in Fig. 14 thereby to shut off the flow of ice cream to the spout 11 without, however, opening the passage to the port 87 for the spout 11r. Thus, there will be no flow of ice cream from the valve structure into the spout 11r during the portion of the filling cycle in which the empty carrier 14r is moving down to carton-discharging and receiving position. Similarly, in the event of failure to present a carton to the filling spout or nozzle 11, the rod 119 will be pushed upwardly by the crosshead 57 while the rod 53 will be permitted to remain stationary. Hence the outer valve sleeve 91 will alone be rocked from the position shown in Fig. 13 to the position shown in Fig. 14 so as to cause its segment 91a to close the port 87 to the spout 11r without opening the passageway to the port 86 and spout 11 while also establishing communication with the by-pass port 88. Now when the filling period for the spout 11 has passed and an empty carton is again in place on the spout 11r, the crosshead 57r moves upwardly and the push rod 53r will cause outer sleeve 91 to again return to the position of Fig. 13 so as to deliver ice cream to the spout 11r. During this movement of the sleeve 91, the sleeve 99 remains stationary because the rod 53r, having been suspended in up position, will not be engaged and actuated by the rising crosshead 57r.

The latch mechanism associated with the crosshead 57r comprises a lever 122 pivoted intermediate its ends as indicated at 123 on the crosshead. The inner end portion 124 of said lever is normally urged by a spring-pressed pin arrangement indicated at 125 into the path of travel of containers carried by the conveyor 5. The outer or front end portion 126 of said lever is adapted to be moved from its normal inoperative position as shown in full lines in Fig. 9 to an operative position (as represented in dotted lines in said Fig. 9) overlying an opening 72r in the crosshead when a box engages the front end portion 124 of the lever and pushes it out of the path of the container. The end portion 126 of the lever is thereby caused to close the hole 72r so that when the crosshead 57r is moved upwardly, the push rod 53r will be correspondingly moved upwardly to actuate the valve as required in the presence of a carton to be filled by the spout 11r.

In the absence of a carton, the lever 122 will, of course, remain in its normal position as shown in full lines in Fig. 9, thereby permitting a reduced diameter lower end portion 54r of the rod 53r to be received in said opening 72r when the crosshead 57r is moved upwardly, whereby said push rod 53r will remain stationary with the result that the outer sleeve element of the valve will not be actuated.

When the carton elevator or carrier 14 is lowered to carton receiving and discharging position a set screw 14a, adjustably mounted on the inner leg 13 of the elevator, engages and depresses the latch pin 73a (Figs. 2 and 8) so as to permit the spring pressed pin 77 to adjust the lever 73 to its open position as shown in full lines in Fig. 8. A similar set screw on the inner leg of the elevator 14r depresses the latch pin 127 of the crosshead 57r, said latch pin 127 being arranged to cooperate with an ear 128 which extends from the latch 122.

For limiting the rotary movement of the valve sleeves, the rock arms 48, 48r, 116 and 116r are each provided with a lug 129 as best shown in Fig. 1 and with an adjustable stop screw 130 threaded through the said lug for engagement with a seat such as 131 provided in the cap 50. These stop screws may be adjusted to insure full movement of the valve sleeves in each direction and to avoid overtravel thereof incident to the momentum of the sleeves under the forces imparted thereto by the actuating rods 53, 119, 53r and 119r.

The mechanism described is such that it provides an intermittent container filling operation but a substantially continuous flow of material in the delivery conduit 78 and through the valve structure. This is especially advantageous as already pointed out in connection with the filling of ice cream from a continuous type freezer, the operation of which is significantly disturbed if the continuous discharge of ice cream therefrom is interrupted. By reference to the timing chart, Fig. 11, it can be seen that each outlet port 86 and 87, is open for slightly more than one half of each filling cycle, counting from the beginning of port opening movement of the valve to completion of the closing movement for the same port. The opening is preferably effected somewhat gently or gradually to avoid spurting of material out of the spout and closing may be effected more rapidly and somewhat in advance of the terminal portion of downward movement of the carton being filled. Closing in this manner insures that any drippage from the spout will be caught in the carton before it is returned to the conveyor and carried away. Gradual opening of the valve as explained, helps to keep the lower end of the nozzle or spout in a clean and sanitary condition, the arrangement being such that the spout is never dipped into the ice cream in the carton being filled. Of course, the closing gates on the end of the spout aid materially in this matter of cleanliness in that they operate to pinch off the ice cream stream so that the last trickle of ice cream out of the nozzle drops in about the center of the carton so that there is no substantial tendency for the mechanism to spill ice cream over the outside of the carton.

As shown by the timing diagram, the opening of port 86 partially overlaps the closing of the port 87 and the closing of the port 86 overlaps the opening of the port 87. This avoids any momentary starting and stopping of material flow in the conduit 78 and through the valve 79.

The flexible gates (such as the gates 40—40) which close the lower ends of the respective spouts or nozzles 11 and 11r, cooperate with the valve 79 to very positively stop the flow of material out of the spout and conduit portions connecting the spouts with the valve 79. Theoretically, the closing of the ports 86 and 87 of the valve 79 should stop the flow out of the spouts 11 and 11r respectively. However, as a practical matter, there would remain considerable danger that the weight of the ice cream or other material in the spout would cause delayed, unintended discharge of such material from the spout. The flexible gates 40—40 prevent such accidental and undesirable discharge, thereby maintaining the spouts full of material ready to be delivered to containers so as to insure the delivery of a predetermined, full measure of material to each container. The closing movement of the gates 40—40 in the direction of flow of the material through the spouts, and the gradual convergence of said plates enables them to stop said flow without developing significant back pressure in or compacting of the material contained in the spouts.

In the foregoing explanation, ice cream has been repeatedly mentioned as the material being filled. This is however, without limitation as to the adaptation of the method and apparatus described, to the filling of containers with other fluid materials which may be handled by the method and apparatus with or without modification to accommodate the special characteristics of the material to be handled. The appended claims should be also interpreted accordingly.

Various changes in the described details may be made while retaining the principles of the mechanism described and employing the method of operation of the same.

I claim:

1. Packaging apparatus of the class described comprising a pair of conveyors for propelling containers to and from predetermined filling positions respectively associated with said conveyors, a pair of filling nozzles respectively associated with said filling positions, a conduit for material to be packaged, connections from each of said filling spouts to said supply conduit including a valve having an inlet port connected to said supply conduit and a pair of discharge ports to which said nozzles are respectively connected, said valve being operable to alternately establish communication of said nozzles with said conduit so as to thereby effect delivery of material from said supply conduit alternately to said filling nozzles, said valve also having a bypass port and being operable to close both of said outlet ports and to establish communication between said supply conduit and said bypass port to thereby maintain continuous flow of material in said supply conduit in the event that both of said outlet ports are closed to prevent delivery of material to either of said filling spouts.

2. Apparatus according to claim 1 in which there is provided means for automatically actuating the valve to effect alternate communication of the outlet ports of the valve with the inlet port to thereby alternately deliver material to the filling nozzles and containers disposed in the filling positions respectively associated with said filling nozzles, and carton controlled means for controlling the operation of said valve so as to prevent opening of the valve outlet ports to the respective filling nozzles in the absence of a container for receiving material from the respective nozzles.

3. Packaging apparatus of the class described comprising a normally stationary, vertically elongated filling spout having a lower end opening for discharging material into a container, valve plates disposed externally of said spout for closing the discharge end of said spout, said plates being mounted for movement both lengthwise and transversely of the spout to effect opening and closing thereof so as to provide an unobstructed passageway for material to be packaged when said plates are in open position, and means for effecting opening and closing movement of said valve plates.

4. Packaging apparatus of the class described comprising a normally stationary vertically elongated filling spout having a lower end opening for discharging material into a container disposed in receiving position relative to the spout, means disposed externally of said spout for closing the discharge end thereof and movable lengthwise of the spout to effect opening and closing thereof, a supply conduit for delivering material to be packaged to said filling spout, material conducting means including a valve structure connecting said spout to said supply conduit, means for effecting opening and closing movement of said valve structure and means interconnecting said spout closing means and said valve structure to effect substantially simultaneous closing of said means and adjustment of said valve structure to stop the flow of material from said supply conduit to said spout.

5. Packaging apparatus of the class described comprising a pair of relatively independent spouts for delivering material to receptacles disposed in predetermined receiving positions relative to the respective spouts, a pair of conveyors respectively associated with said spouts and operative to successively position a succession of containers in said filling positions, a supply conduit, a by-pass conduit, a valve structure having inlet and bypass ports respectively connected to said supply and bypass conduits, and a pair of outlet ports respectively connected to said filling spouts, a pair of movable members in said valve structure normally movable in unison to alternately close and open said outlet ports to thereby alternately establish communication between said supply conduit and said spouts, said pair of members also serving to normally close said by-pass port and being movable independently of each other to respectively close one of said outlet ports and open said by-pass port.

6. Packaging apparatus as set forth in claim 5 wherein the valve structure comprises a cylindrical body member having inlet and by-pass ports and a pair of outlet ports, said ports being respectively connected to the supply conduit, the by-pass conduit and the filling spouts, end plates mounted for rotation in end-closing relationship to said cylindrical body member, said end plates each having a cylindrical sleeve projecting into said body, said sleeves being a rotary sliding fit one within the other and the outermost of said sleeves being a rotary sliding fit on the inside of said cylindrical body member, said sleeves being provided with passageways and segments so arranged that said sleeves are adapted to be oscillated in unison to alternately open and close said outlet ports so as to alternately establish communication of said supply conduit with said outlet ports while maintaining said by-pass port closed, said passageways and segments being also so arranged as to be operative to effect simultaneous closing of both of said outlet ports and opening of said by-pass port as an incident to independent rotary adjustment of one of said sleeves relative to the other and relative to said cylindrical body member.

7. Packaging apparatus of the class described comprising a pair of relatively independent spouts for delivering material to receptacles disposed in predetermined receiving positions relative to the respective spouts, a pair of conveyors respectively associated with said spouts and operative to successively position a succession of containers in said filling positions, a supply conduit, a by-pass conduit, a valve structure having inlet and by-pass ports respectively connected to said supply and by-pass conduits, and a pair of outlet ports respectively connected to said filling spouts, a pair of movable members in said valve structure normally movable in unison to alternately close and open said outlet ports to thereby alternately establish communication between said supply conduit and said spouts, said pair of members also serving to normally close said by-pass port and being movable independently of each other to respectively close one of said outlet ports and open said by-pass port, a pair of alternately movable valve actuating members respectively associated with said spouts, a pair of devices respectively operatively connecting each of said valve actuating members respectively to said movable valve members whereby movement of said members is operative to alternately adjust said movable valve members to alternately establish communication between said spouts and said supply conduit as aforesaid, and means associated with each of said actuating members and controlled by a carton in filling position relative to the respective spouts for controlling the operative connection between one of the operating devices of each of the valve members and its actuating member, the arrangement being such that in the absence of a receptacle in filling position relative to a spout, only one of said pair of movable valve members will be actuated to thereby shut off the flow of material from said supply conduit to one of said spouts upon completion of the filling of a carton thereby without also establishing communication between said supply conduit and the other of said spouts, and to also establish communication between said supply conduit and said by-pass conduit to thereby maintain the flow of material in said supply conduit.

8. Packaging apparatus according to claim 7 wherein the valve member operating devices comprise two pair of push rods, one push rod of each of the pairs being connected to one of the movable valve members and the other push rod of each pair being connected to the other movable valve member, and wherein the valve actuating members comprise a pair of reciprocable members respectively associated with said pairs of push rods and arranged to engage and respectively move the pairs of rods in a predetermined direction to thereby actuate the valve members, said actuating members being provided with openings therein adapted to receive an end portion of one of the rods actuated thereby and with cover plates mounted thereon for movement selectively to and from positions covering and uncovering the respective openings, means normally urging said cover plates to move to opening uncovering position, said cover plates having portions projecting into the filling positions of containers whereby containers delivered to said filling positions are operative to move said cover plates to opening covering position.

9. In apparatus of the class described, a valve having an inlet port, a by-pass port, and a pair of outlet ports, two movable elements adapted to be selectively moved in unison for effecting alternate opening and closing of said pair of outlet ports while maintaining said by-pass port closed, said elements being also movable independently of each other to effect closing of one outlet port and opening of the by-pass port while the other element remains stationary in position maintaining the other outlet port closed, a pair of rods respectively connected to said two movable valve elements for effecting movement of the same in one direction, a reciprocable member movable in the direction of the length of said rods and engageable with the ends thereof for effecting movement thereof, said reciprocable member having an opening therein adapted to receive an end portion of one of said rods to thereby prevent actuation of the rod incident to reciprocation of the member, a cover plate pivotally mounted on said member and having a portion movable into overlying relation to said opening to thereby prevent said push rod portion from entering said opening and to cause actuation of said push rod incident to operative movement of said actuating member, said cover plate having another portion normally projecting into the filling position of a container to be filled whereby a container delivered into filling position is operative to rock said cover plate into operative position over said opening, means normally urging said cover plate member into inoperative position, a spring actuated latch pin carried by said member for normally locking said cover plate in operative position and having a recess for receiving a portion of said cover plate to permit the latter to be moved to said inoperative position, carton elevating means operative to raise and lower said carton for filling purposes, and means associated with said carton raising and lowering means for adjusting said latch pin to a position in which the recess therein is adapted to receive a portion of said cover plate when the carton elevating means is in lowered position, thereby to permit said cover plate to be moved to inoperative position relative to said opening in the absence of a carton in said carton elevating means.

10. In packaging apparatus wherein receptacles are successively advanced horizontally to a filling position and then raised and lowered for filling purposes, and wherein there is provided receptacle raising and lowering means and a valve having two movable members which are adapted to be selectively actuated in unison or independently of each other, means for actuating said valve members comprising a pair of rods respectively connected to the two valve members, a reciprocable member operative to engage the ends of said rods to actuate the same and said valve members as an incident to reciprocation of the member, said member having an opening therein aligned with one of said rods for receiving an end portion of such rod to thereby prevent operation of such rod whereby only the other rod and valve member to which it is connected will be actuated, a plate pivoted on said reciprocable member and having a portion movable into and out of covering relation to said opening and another portion projecting into the filling position of a carton whereby a carton delivered to said filling position is operative to engage and rock said plate member so as to cause the opening-covering portion thereof to move into covering position to thereby enable said reciprocable member to actuate both of said rods in unison as an incident to the reciprocation of the member, a latch movable into and out of the path of movement of said pivoted plate member and operative when in said path to hold said plate member in operative position, and means carried by the receptacle raising and lowering means for moving said latch to permit said pivoted plate to move to inoperative position when the receptacle raising and lowering means is lowered to receptacle receiving position.

11. Packaging apparatus of the class described comprising a filling spout, means for positioning a receptacle to receive material from said spout, said spout having an open end for discharging material into such receptacle and a pair of valve plates mounted on said spout for simultaneous movement in the direction of flow of material through said spout and transversely thereof from an open position to a position in which end portions of the respective plates engage each other within the area of the open end of the spout to close the same, and means for actuating said valve plates.

12. In a packaging machine of the class described, an axially elongated filling spout of approximately rectangular cross section, said spout having an open end for discharging material to be packaged, and means for closing said open end comprising a pair of valve plates mounted on said spout for sliding movement axially thereof, said plates having body portions which are disposed and movable in parallel relationship to one opposed pair of walls, and having end portions which are flexibly connected to said body portions and which, as an incident to such parallel movement of said body portions, are movable transversely across the open end of the spout into cooperating spout closing relationship, means for guiding said portions into said spout closing relationship, and means for effecting movement of said plate body portions in said parallel relationship to said spout walls.

13. In a packaging machine of the class described, an axially elongated filling spout of approximately rectangular cross section, said spout having an open end for discharging material to be packaged, one opposed pair of walls of said spout being extended beyond the ends of the other pair of walls at said open end, and means for closing said open end comprising a pair of valve plates mounted on said spout for sliding movement axially thereof, said plates having body portions which are disposed and movable in parallel relationship to said other pair of walls, and having end portions which are flexibly connected to said body portions and which, as an incident to such parallel movement of said body portions, are movable transversely across the open end of the spout into cooperating spout closing relationship with said extended wall portions, means for guiding said end portions into said spout closing relationship, and means for effecting movement of said plate body portions in said parallel relationship to said spout walls.

14. A filling spout structure in a packaging machine as set forth in claim 13 wherein the spout sides having the extended end portions are provided with grooves extending longitudinally thereof outwardly of the other pair of spout sides, and wherein the valve plate body and end portions are integrally connected portions of flexible sheet members which are slidably mounted in said grooves, portions of said grooves at the open end of the spout converging so as to guide the said end portions of the plates toward and from spout closing position between said wall extensions.

15. In packaging apparatus having a supply conduit, a pair of filling spouts which are normally opened alternately to deliver material into containers in such timed relation to each other as to maintain a substantially continuous flow of material in said supply conduit, and means associated with each spout for stopping the flow of material thereto in the event that there is no container in position to receive material from the spout; a by-pass conduit, connections from each of said filling spouts to said supply conduit and from said by-pass conduit to said supply conduit including valve means operable to alternately establish communication of said nozzles with said supply conduit, and, in the event of stoppage of the flow of material to a spout because of the absence of a container to receive the material, to establish communication between said supply conduit and said by-pass conduit to thereby divert the material flow from such spout to said by-pass conduit so as to maintain continuous flow of material in said supply conduit, and means for so operating said valve means.

FRANK C. GROSS.

REFERENCES CITED

The following references are of record in the file of this patent:

UNITED STATES PATENTS

| Number | Name | Date |
| --- | --- | --- |
| 602,282 | Campbell et al. | Apr. 12, 1898 |
| 647,283 | Singrun et al. | Apr. 10, 1900 |
| 2,208,028 | Harrington | July 16, 1940 |
| 2,340,536 | Joplin | Feb. 1, 1944 |